United States Patent

[11] 3,554,158

[72] Inventors Keizo Shimano;
Takuo Ishida, c/o Shimano Industry Company, No. 77, 3-cho, Oimatu-cho, Sakai, Osaka, Japan
[21] Appl. No. 766,495
[22] Filed Oct. 10, 1968
[45] Patented Jan. 12, 1971
[32] Priority May 11, 1968, Sept. 3, 1968
[33] Japan
[31] 43/38721 and 43/76257

[54] INDICATING SYSTEM OF OPERATIONAL STATE OF THE PARKING BRAKE FOR A BICYCLE
3 Claims, 6 Drawing Figs.
[52] U.S. Cl. .................................................... 116/114, 74/489, 116/124, 116/135, 192/4
[51] Int. Cl. ..................................................... G01d 21/00
[50] Field of Search .......................................... 116/58A, 114, 115, 115.5, 124, 135; 74/473, 475, 487, 489; 188/1, 1A; 192/4, 6, 12, 36; 200/50.3

[56] References Cited
UNITED STATES PATENTS

| | | | |
|---|---|---|---|
| 2,293,698 | 8/1942 | Chaput......................... | 116/124 |
| 2,905,017 | 9/1959 | Randolph...................... | 74/489 |
| 3,301,086 | 1/1967 | Williams et al. .............. | 74/475 |
| 3,352,173 | 11/1967 | Freeland ...................... | 196/6X |
| 3,406,587 | 10/1968 | Brilando et al. .............. | 74/475 |
| 3,418,965 | 12/1968 | Rabinow ....................... | 116/115.5 |

Primary Examiner—Louis J. Capozi
Attorney—Moonray Kojima

ABSTRACT: A bicycle indicator system for showing the operational state of a brake and the speed of a gear shift system, in which a brake position indicator is moved by a brake handle which also operates the brake, in such a manner as to cover a gear shift indicator when the brake is applied and to uncover the gear shift indicator when the brake is released thereby to permit an operator to determine when the bicycle is in a braked condition and if not what gear shift position is employed.

INDICATING SYSTEM OF OPERATIONAL STATE OF THE PARKING BRAKE FOR A BICYCLE

This invention is related to an indicating system of the operational state of a parking brake for a bicycle which has to be continuously applied to the bicycle lest it should move by itself unexpectedly against a cycler's own will when the bicycle is left parked on a sloping road or an incline. As this parking brake has conventionally been applied a caliper brake in general use of a bicycle in which a brake lever is especially devised in such a manner that said caliper brake can be operated independently; said brake lever being invested with a greater resistance than the dynamical stability of a restorable spring provided on said caliper brake so that the brake lever, once manipulated, is sustained in the position where it has been just manipulated, and yet continues its brakage without being automatically restored to its original position even after it has been taken off. Thus in order to release this brakage it is necessary to additionally manipulate the brake lever to be restored to its original position.

The parking brake is applicable not only when a cycler wants to park the bicycle securely on a slope or an incline as has been mentioned, but also when he wants to cycle down in safety along a long sloping road; in this case the cycler can manage to go down along an incline by applying half pressure to the brake and continuously controlling the speed of the bicycle.

As has been mentioned, the parking brake lever is on the one hand able to be manipulated continuously but on the other hand it has a disadvantage in that an additional operation must be made to release the breakage. Therefore, if the cycler carelessly tries to pedal the bicycle after he has put on the brake, he will be unable to ride an inch and may on the worst occasion violently tumble over; on the top of that; surplus power is undesirably effected upon the brake to wear out the shoes thereof, and consequently when really necessary, the brake will not work satisfactorily.

The present invention has been made for the purpose of eliminating the aforementioned deficiencies, having for one of its main objectives a provision of such an indicating system as to warningly indicate the operational state of the parking brake when it is applied, and as a result the cycler will not go and move the bicycle inadvertently despite the fact that he has just put on the brake, nor will he leave the brake as it has been put on when he intends to ride down along an incline. Another objective of the invention is to supply an indicating system capable of indicating the operational state of the parking brake by use of the interval between a couple of the tubes which compose the frame of the bicycle. Furthermore, another objective of the invention is to provide an indicating system capable of indicating the operational state of the parking brake within a small space that occupies around the frame of the bicycle fabricated of a single piece of the tube. The present invention has a characteristic in that, when the parking brake is manipulated and moved with its lever, an indicating means for indicating the movement of this brake is also moved in the direction where said parking brake lever is slidably moved, and consequently said indicating means is able to indicate the operational state of the parking brake.

While the specification of the invention is as detailed in the description which will be made herein in accordance with the accompanying drawings, its novelty and features are as pointed out in what is claimed.

Referring to the drawings illustrating one of the typical embodiments of the present invention, FIGS. 1 thru 3, are illustrative of the embodiments of the invention in which the top tube of the bicycle fabricated of a couple of the tubes is constructed within the interval between these tubes wherein;

FIG. 4 is a plan view thereof, FIG. 5 is a cross section view taken in the line of V–V of the FIG. 4, and FIG. 6 is a cross section view taken in the line of VI–VI of the FIG. 4.

Figure 1:
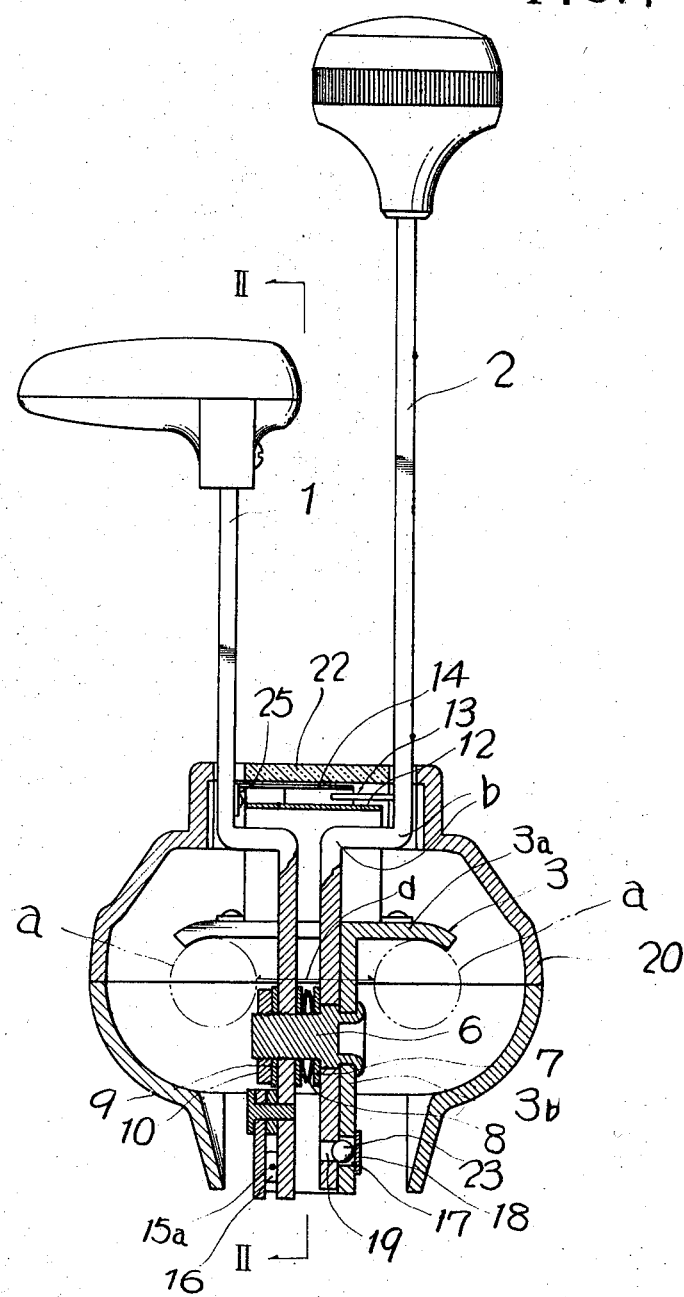
FIG. 1 is a vertical section view thereof.
Figure 2:
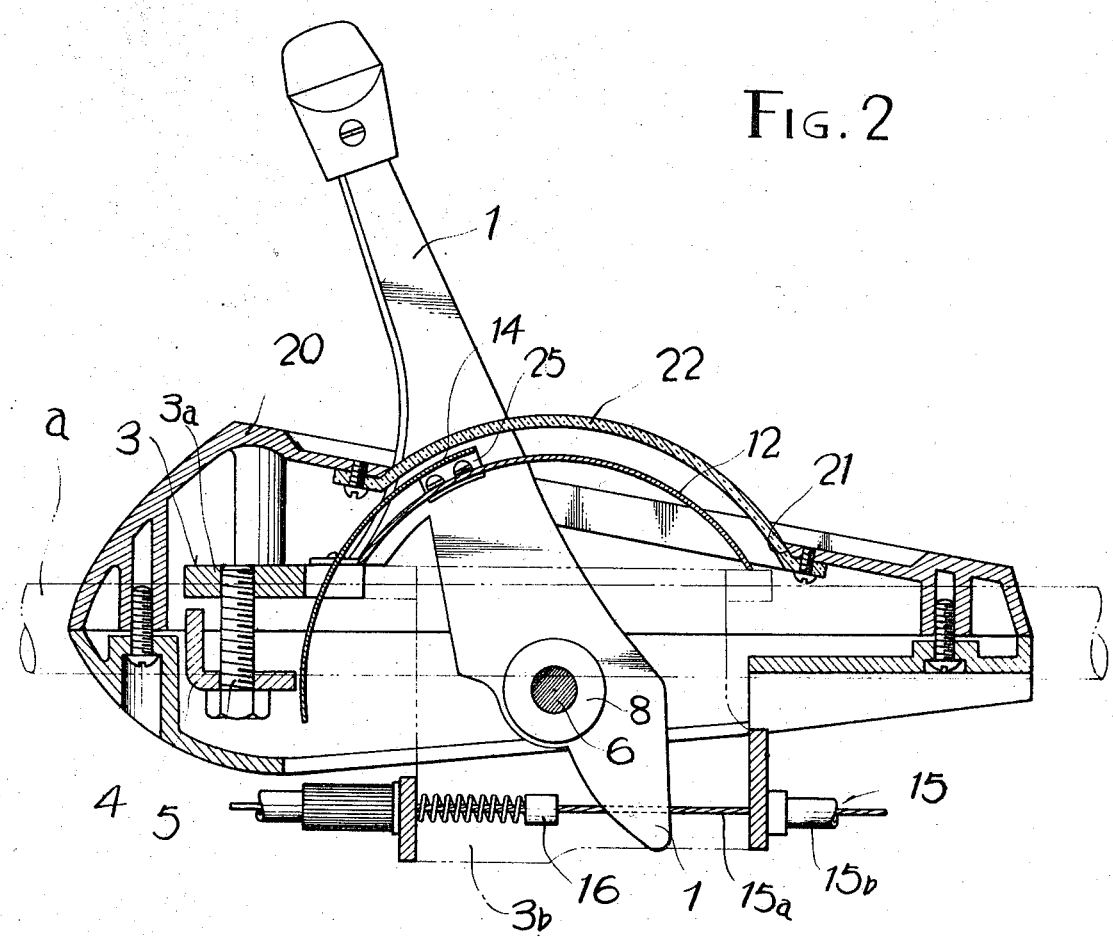
FIG. 2 is a cross section view taken in the line of II–II of the FIG. 1.
Figure 3:
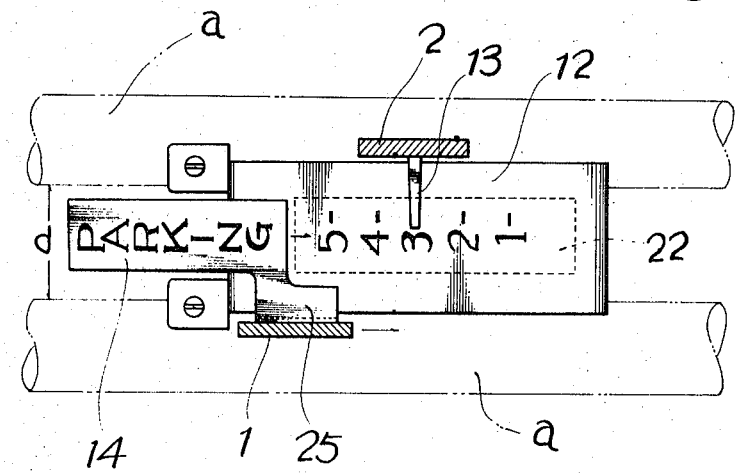
FIG. 3A is a plan view illustrative of the parking brake not in operation.
FIG. 3B is a plan view illustrative of the parking brake in operation.
Figure 3:
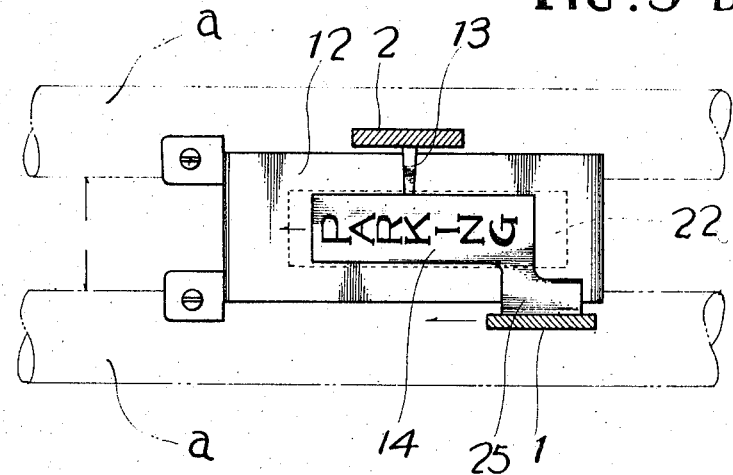

Now setting forth one of the embodiments made in accordance with the present invention with reference to FIGS. 1, 2, 3A, and 3B of the accompanied drawings, these drawings are all illustrative of the construction where the shift gear lever 2 and the parking brake lever 1 are both provided in parallel to the top tube $a$ of the bicycle fabricated of a couple of tubes. Reference numeral 3 designates a fixing plate formed approximately in T-shape with respect to its vertical section and is fixedly tightened with a bolt 5, having the top tube $a$ pressed between its horizontal portion $3a$ and a clasp 4 provided independently thereof. On one side of the vertical portion $3b$ of said fixing plate 3 is protruded a lateral shaft 6, into which are inserted through a washer 7 and a dish plate 8 the shift gear brake 1 and the parking brake lever 2. A rotation stop washer 9 and a tightening nut 10 are screwed up on the outermost end of the lateral shaft 6. Subject to the allowance of this screwing, it is adjustably possible to maintain the stationary state of the parking brake in any free position where it has been held at a stop. The parking brake lever 1 and the shift gear lever 2 are oppositely fashioned into a bending portion $b$ to come nearer each other in their mounting place so that both can be provided between a couple of said tubes. Between the upper portions of these two levers, whose interval is wider than the bending portion $b$, is located a speed indicating graduation 12 laterally formed in a circular arc which has the same center as the rotation loci of these levers 1 and 2, and an edge of said indicating graduation 12 is fixed on the horizontal portion $3a$ of the fixing plate 3, said indicating graduation being marked with letters or any other signs to express each speed of the shift gear. An indicator 13 capable of indexing each of said signs is provided on one side of the shift gear lever 2. To this lever 2 is connected the inner wire of the brake wire not shown in the drawing. Thus when the lever 2 is moved, the shift gear is switched over and at the same time the indicator indexes a sign corresponding to the changed speed, thereby making it possible to read each speed into which the shift gear has been switched.

On the parking brake lever 1 is provided through a fixing element 25 an indicating plate 14 for indicating the operational state of the parking brake. This indicating plate 14 is narrower in width than the interval between the two pieces of the tubes composing said top tube and covers said indicating graduation 12 and indicator 13. Therefore, according as the parking brake lever 1 is moved, this indicating plate 14 is moved back and forward within said interval $d$. It is noted that on the surface of this indicating plate 14 is written such a letter as PARKING or the like to teach that the parking brake is in operation. In accordance with the aforementioned movement of the indicating plate 14, the indicating graduation 12 and the indicator 13 are both cloaked and at the same time, the indicating plate 14 indicates the sign to teach that the parking brake is in operation. In the drawings reference numeral 15 designates the brake wire connected to the parking brake, 15$a$ designates the inner wire and 15$b$ does the outer wire.

As has been mentioned, in the drawings of the present invention is illustrated a single brake which attains the two purposes of parking the bicycle and also of controlling its speed when it is wheeling on. According to the construction of this single brake, there is a stopper 16 provided on the inner wire 15$a$ of the intermediate portion of the brake wire; and said stopper 16 is connected to one side of the brake lever 1 so that it can move the inner wire 15$a$ through the movement of said brake lever 1. A ball 23 is freely mounted in the notch provided in the lower portion of the fixing plate 3 and pressed toward the shift gear lever 2 through a plate spring 18. A plurality of notches 19 are provided on the brake lever 2 with opposite relation to said notches 17, so that said ball 23 can be inserted into one of the notches 17 through the movement of the brake lever 1, that is, through the switching over of the shift gear. Reference numeral 20 designates a shelter for covering each of said elements. On the immediately upper portion of said indicating graduation 2 is formed an aperture 21 having the same width as or larger width than that of said indicating plate 14 and a transparent plate 22 is mounted on this aperture 21. Therefore, if the brake lever 1 is moved to operate the parking brake lever when the cycler intends to park the bicycle or ride down a sloping road, then said indicating plate 14 advances toward the lower side of the transparent plate 22 and clocks the indicating graduation 12 for indicating the speed changed state, and at the same time makes an indication to teach him that the parking brake is in operation.

Figure 4:
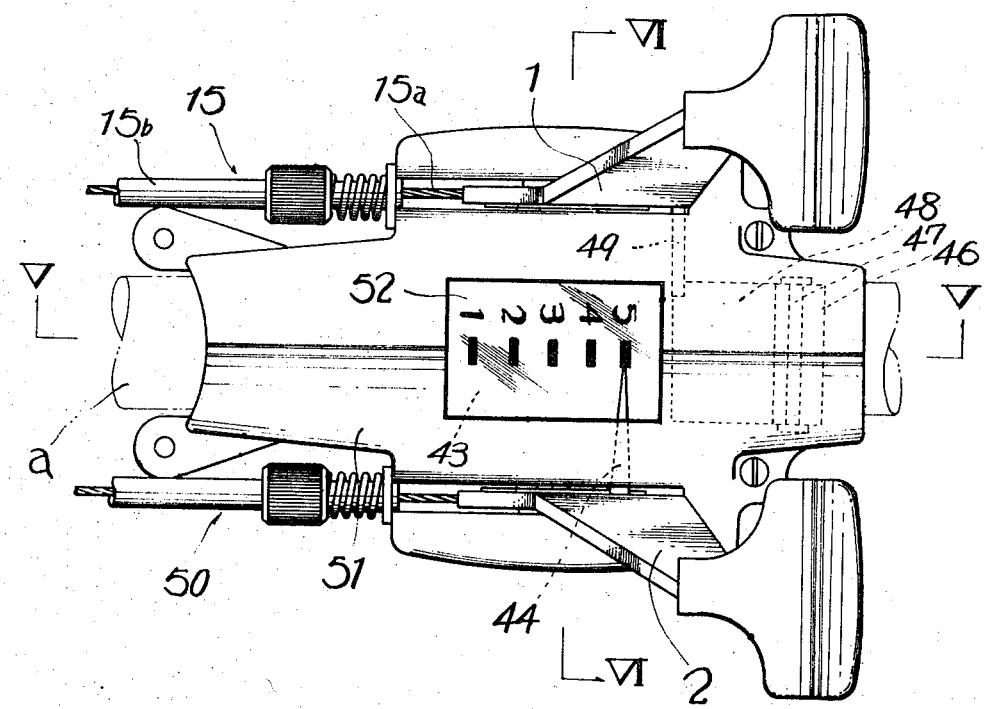
FIGS. 4 through 6 are illustrative of the construction in which the parking brake is provided on the top tube of the bicycle fabricated of a single tube and especially.
Figure 5:
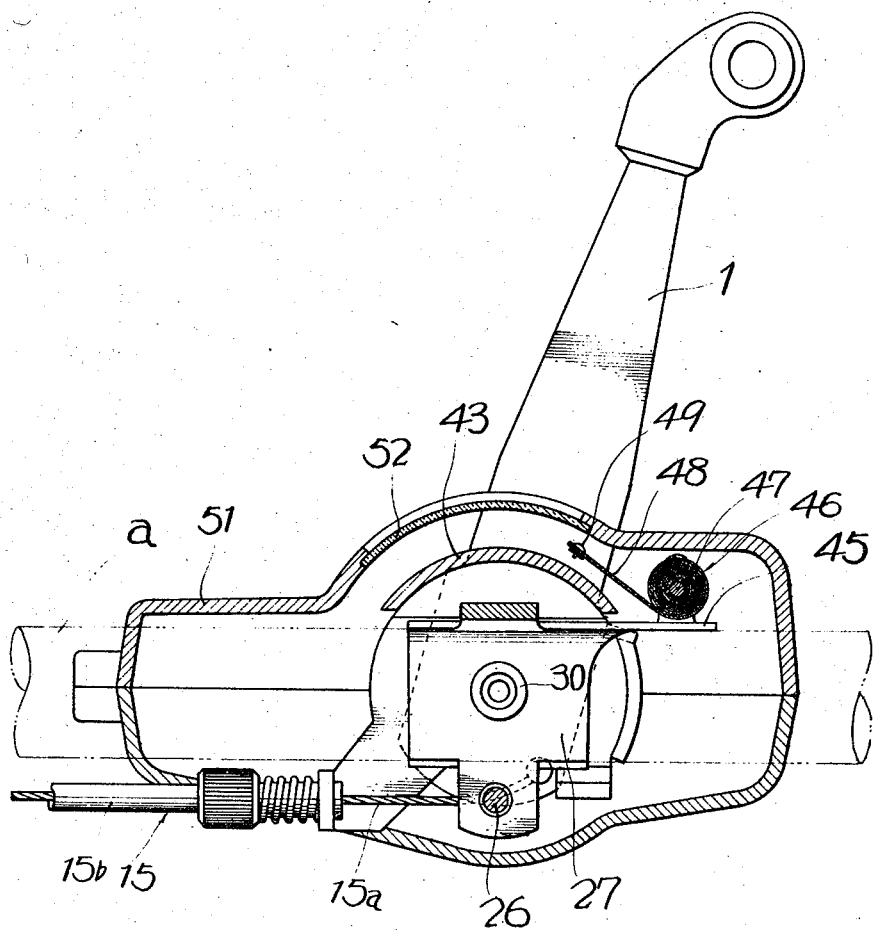
Figure 6:
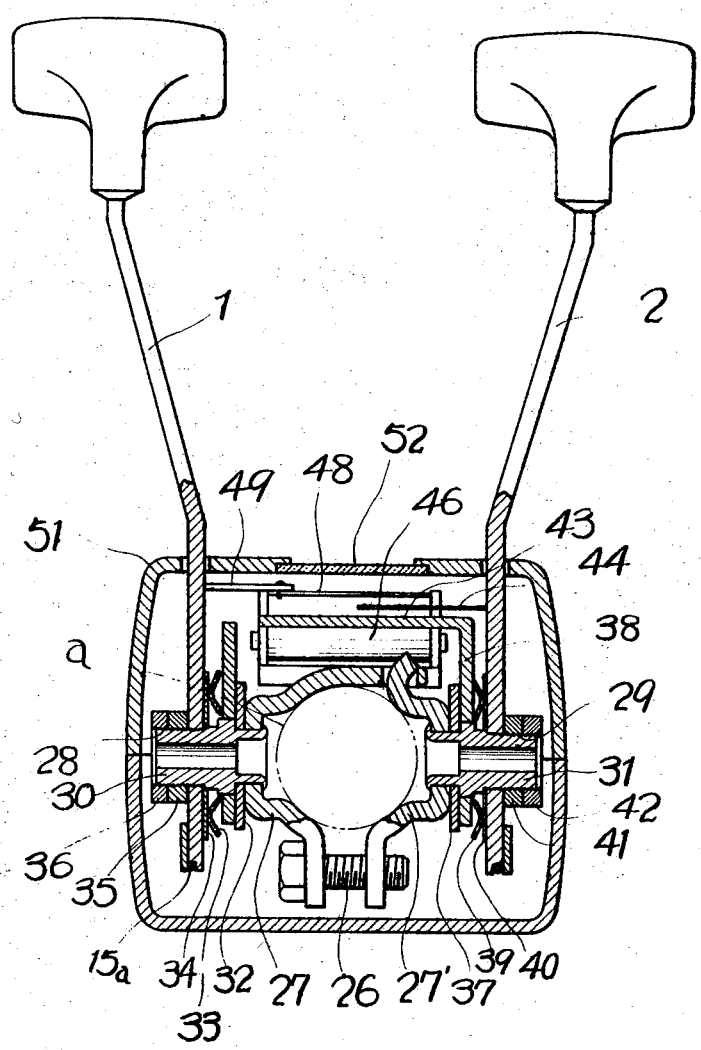

Accounting for another embodiment of the present invention with reference to the FIGS. 4 through 6 of the drawings, the indicating means shown therein is mounted on the frame of the bicycle fabricated of a single tube. Instead of the T-shaped fixing stand used in the aforementioned embodiment, there are adopted fixing elements 27 and 27' which hold the tube therebetween and are fixed by means of a tightening bolt 26. On both sides of said fixing elements are protrudedly fixed the lateral shafts 30 and 31 having in the foremost ends thereof the screws 28 and 29 threaded up. On the lateral shaft 30 is inserted the lever 1 of the parking brake through pedestals 32, a dish spring 33 and a washer 34, and with said screw 28 is threaded a tightening nut 36 through a rotation stop washer 35 thereby making it adjustably possible to maintain the stationary state of the brake lever 1 in any optional position subject to the allowance of this screwing. Likewise, on another lateral shaft 31 is inserted the lever 2 of the shift gear through pedestal 37, a plate body 38, a dish spring 39 and a washer 40, and with said screw 29 is threaded a tightening nut 42 through a rotation stop washer 41 thereby making it adjustably possible to maintain the stationary state of the shift gear lever 2 in any optional position subject to the allowance of this screwing. In the upper portion of the plate body 38 mounted upon the lateral shaft 31 on the side of the shift gear lever 2 is held an indicating graduation 43 having its surface marked with signs such as numerals at which the speed of the bicycle is to be indicated. On one side of this shift gear lever 2 an indicator 44 is provided to index the signs of the indicating graduation 43. A roller 46 is mounted on a supporting stand 45 formed in the extension of said fixing element 27, and the shaft 47 of said roller 46 is rolled up with a resilient steel belt 48 whose width is almost equal to or a little larger than that of said indicating graduation 43. The free end of this steel belt 48 is fixed on the rod 49 extended from the parking brake lever 1. Thus when the lever is moved to operate the brake, the steel belt 48 is forcedly pulled out from the roller 46 against the its resiliency, and said indicating graduation 43 and indicator 44 are both cloaked with this steel belt 48. The surface of the steel belt 48 is marked, for example, with a letter PARKING to teach the cycler that the brake is in operation, or with red or any other colors to attract his attention.

Accordingly, if the lever 1 is moved to operate the parking brake when the cycler wants to park the bicycle or when he is riding down along a sloping road, the steel belt 48 is pulled out of the roller 46 and cloaks the indicating graduation 43 indexing the changed speed of the shift gear, and at the same time the indication is made by this movement of the steel belt 48 to teach that the parking brake is in operation. There is a brake wire 50 connected between the shift gear and the lever 2 for manipulating this gear. A shelter 51 cloaks the whole body of the shift gear and or the immediately upper portion of the indicating graduation 43 is provided an aperture covered with a transparent plate 52 through which the cycler is able to see the indicating graduation 43.

As has been mentioned, in the embodiment of the present invention is formed the indicating graduation fabricated of either a tabulate element or a roll belt element, which is to move along with the parking brake lever. Therefore when the lever is moved to operate the parking brake, said indicating graduation indicates the operational state of the brake, thereby making it possible to park the bicycle safely on an incline or control securely its speed liable to be accelerated by adjusting the shift gear brake when the cycler is going down a slope, and also making it possible to warningly remind him with an appeal of said indicating means that the parking brake is in operation when he has operated it.

With a result of this, the cycler will not start the bicycle nor keep on riding it despite the fact that he has operated the parking brake. Thus there are eliminated a jeopardy of tumbling over and the wearing out of the brakeshoe. The indicating means is to move by the same distance that the parking brake lever is to move and an indication of this movement is made by said indicating means. Accordingly by observing the movement state of this indicating means, the operational state of the brake can be clearly judged to confirm whether the bicycle is in half brake or in full brake, and especially when the cycler goes down a slope he can see to it that the brake is fully in operation well adjusted to the inclination of the slope.

According to the present invention it is possible to supply an indicating means provided on a bicycle frame fabricated of the two pieces of the tubes, by the best use of whose interval there can be constructed said means in a compact size. Particularly it is to be noted that the effect of the indicating means thus constructed should be raised when a tabulate element is adopted as this indicating means. This is because, when the tabulate element is utilized for this purpose, it is necessary to secure the length of its movement equal to the length of said element plus that of the indicating graduation plate marked with the signs expressing each speed of the shift gear and thus use can be made of the interval between a couple of the tubes forming the course of the movement which said element makes, thereby making it possible to construct said indicating means in a very small space. Furthermore, according to this invention, an indicating means has an indicating element formed in a roll belt type and there is no need of using two pieces of the tubes but a single piece of the tube is enough to construct said means. Thus the course of said movement is traced through within the length of said indicating graduation plate and the space for accommodating this means is made extremely reduced upon the whole. The present invention teaches both the method of indicating the operational state of the parking brake and the idea of cloaking the indicating plate for indicating the operational state of the shift gear so that the cycler should not manipulate the shift gear lever by mistake when the parking brake is just in operation. No excessive force is obtruded on the shift gear to give rise to a breakdown thereto accordingly, and always is secured the operation of the parking brake in the right way.

We claim:

1. An indicator system for a bicycle having a brake system, a gear shifting system and a frame, comprising:
  a. a cabinet means affixed to said frame with an opening at the top thereof;
  b. pivot means affixed to said frame and within said cabinet means;
  c. first handle means pivotally mounted about said pivot means and extending from said frame through the top of said cabinet means, and operably connected to said brake system;
  d. means for frictionally maintaining the position of said first handle means until manually moved;
  e. second handle means pivotally mounted on said pivot means and extending vertically from said frame through the top of said cabinet means and operably connected to said gear shifting system;
  f. gear shift indicator means attached to said cabinet means and aligned to said opening, said gear shift indicator means having a surface with speed indication indicia thereon;
  g. needle means connected to said second handle means for pointing opposite the speed corresponding to the particular gear speed used;

h. brake position indicator means having sufficient surface area to cover the portion of said gear shift indicator means appearing under said opening; and i. means for connecting said brake position indicator means to said first handle means and above said gear shift indicator means whereby movement of said first handle means to a braked position causes said brake position indicator means to cover said gear shift indicator means from view through said opening, and whereby movement of said first handle means to a nonbraked position causes said brake position indicator means to uncover said gear shift indicator means from view through said opening.

2. The indicator system of claim 1 further comprising a curved transparent plate mounted within said opening of said cabinet means, wherein said gear shift indicator means comprises a curved surface located below said transparent plate, wherein said brake position indicator means comprises a curved surface located between said transparent plate and said gear shift indicator means, and wherein said connecting means comprises a connecting rod means extending from said brake position indicating means, and fixing means for affixing said connecting rod means to said first handle means.

3. The indicator system of claim 1, wherein said brake position indicator means comprises a reel and shaft arrangement mounted on said cabinet, a flexible tape normally reeled onto said reel shaft, and a spring means for normally holding said tape in a reeled position, and wherein said connecting means connects one end of said tape such that movement of said first handle means will pull said tape from said reel against pressure from said spring means thereby to cover said gear shift indicator means from view through said opening, and movement of said first handle means in the opposite direction enables said spring means to uncover said tape from said gear shift indicator means to be viewable through said opening.